(12) United States Patent
Mida et al.

(10) Patent No.: US 9,248,713 B2
(45) Date of Patent: Feb. 2, 2016

(54) SAFETY CHAIN ENGAGING DEVICE FOR GOOSENECK HITCH

(71) Applicant: Cequent Performance Products, Inc., Plymouth, MI (US)

(72) Inventors: Lynn H. Mida, Chelsea, MI (US); Gail R. Matheus, Salem, MI (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

(21) Appl. No.: 13/867,472

(22) Filed: Apr. 22, 2013

(65) Prior Publication Data

US 2014/0312596 A1    Oct. 23, 2014

(51) Int. Cl.
*B60D 1/28* (2006.01)
*B62D 53/08* (2006.01)
*B60D 1/58* (2006.01)

(52) U.S. Cl.
CPC . *B60D 1/28* (2013.01); *B60D 1/583* (2013.01); *B62D 53/08* (2013.01)

(58) Field of Classification Search
USPC ................ 280/417.1, 425.2, 432, 441.2, 480, 280/480.1, 491.5, 495, 496, 497, 498, 499, 280/507
See application file for complete search history.

(56) References Cited

U.S. PATENT DOCUMENTS

| | | | |
|---|---|---|---|
| 5,435,585 A * | 7/1995 | Chambers | 280/415.1 |
| 5,571,270 A | 11/1996 | Larkin | |
| 5,738,363 A | 4/1998 | Larkin | |
| 5,788,258 A * | 8/1998 | Gill et al. | 280/491.1 |
| 5,893,575 A | 4/1999 | Larkin | |
| 5,971,418 A * | 10/1999 | Lindenman et al. | 280/491.1 |
| 6,024,373 A * | 2/2000 | Wallace | 280/457 |
| 6,199,890 B1 * | 3/2001 | Lindenman et al. | 280/491.1 |
| 6,467,791 B1 * | 10/2002 | Fandrich et al. | 280/491.5 |
| 6,520,528 B2 | 2/2003 | Fandrich et al. | |
| 6,695,338 B1 | 2/2004 | Roberts | |
| 6,783,144 B2 | 8/2004 | McCoy et al. | |
| 6,969,090 B1 | 11/2005 | Works | |
| 6,983,950 B2 | 1/2006 | McCoy et al. | |
| 7,793,968 B1 * | 9/2010 | Withers | 280/496 |
| 7,828,317 B2 * | 11/2010 | Withers et al. | 280/425.2 |
| 8,011,685 B2 | 9/2011 | Belinky et al. | |
| 2008/0238036 A1 * | 10/2008 | Baum et al. | 280/477 |
| 2012/0274048 A1 * | 11/2012 | Stanifer et al. | 280/491.5 |
| 2013/0113181 A1 * | 5/2013 | Stanifer et al. | 280/432 |
| 2013/0127137 A1 | 5/2013 | McCoy et al. | |
| 2013/0307248 A1 * | 11/2013 | McCoy | 280/495 |

OTHER PUBLICATIONS

U.S. Appl. No. 13/833,789, filed Mar. 15, 2013, Inventor: Lynn H. Mida—Gooseneck Hitch Ball.

* cited by examiner

*Primary Examiner* — Joseph Rocca
*Assistant Examiner* — Marc A Scharich
(74) *Attorney, Agent, or Firm* — McDonald Hopkins LLC

(57) ABSTRACT

A safety chain engaging device for a towing vehicle having a gooseneck hitch attached with a rail of the towing vehicle is shown and described. The safety chain engaging device may include a first bracket configured to be secured with the rail of the towing vehicle, and a second bracket attached with the first bracket, the second bracket including a plate member spaced from the first bracket. The safety chain engaging device may also include at least one safety chain engaging member secured with the plate member, where the safety chain engaging member is configured to be laterally spaced from the rail upon securement of the first bracket with the rail.

35 Claims, 8 Drawing Sheets

SAFETY CHAIN ENGAGING DEVICE FOR GOOSENECK HITCH

FIELD OF INVENTION

The present invention generally relates to a safety chain engaging device for a towing vehicle and more particularly to an under bed safety chain engaging device for use with a gooseneck hitch.

BACKGROUND

There are many different types of hitches utilized to connect a towing vehicle with a towed vehicle. These hitches attach towed vehicles with towing vehicles in a variety of ways. Some of the most common types of hitches include gooseneck, fifth wheel, and rear mount. Gooseneck hitches often allow towed vehicles to be connected to towing vehicles by way of a ball hitch secured to the towing vehicle and a ball socket coupling mechanism on the towed vehicle. The ball socket coupling mechanism may be mounted over the ball. This configuration allows the towed vehicle to pivot behind the towing vehicle.

The ball hitch of some hitches, such as a gooseneck, for example, is commonly mounted in the load bed of the towing vehicle near the longitudinal centerline of the load bed. Gooseneck hitches are often attached to the frame of the towing vehicle under the load bed or attached on the load bed of the towing vehicle. In those gooseneck hitches attached to the frame of the towing vehicles, at least one hole is usually cut in the load bed of the towing vehicle for insertion of the hitch ball.

Safety chains are often utilized with gooseneck hitches to provide a secondary means of connection between the rear of the towing vehicle and the front of the towed vehicle. In order to secure the safety chain, the towing vehicle may utilize a safety chain attachment device. These safety chain attachment devices, however, often obstruct the load bed of the towing vehicle when the hitch is not being used. This is particularly problematic for under bed gooseneck hitch systems, which are utilized to avoid such obstruction when not in use. One solution is to drill additional holes in a load bed of the towing vehicle, and secure a safety chain attachment device to part of the gooseneck hitch attached below the load bed. However, drilling additional holes in the towing vehicle is often undesirable due to constraints of such towing vehicle.

For example, certain towing vehicles include a frame member that is attached to the towing vehicle frame below the load bed. The gooseneck hitch may be attached with this frame in any appropriate manner. It, however, may be necessary to drill additional holes within this frame for certain prior art safety chain attachment devices. These additional holes may be extremely difficult to drill or otherwise create as the frame member is often made from a high strength steel or other metal that makes drilling extremely difficult. Moreover, the holes may be undesirable as they may generally weaken the frame and may void manufacturer warranties for the towing vehicle.

A need, therefore, exists for a safety chain engaging device that provides an attachment portion appropriately spaced from the gooseneck hitch without requiring holes to be formed through the frame of the towing vehicle. There is a further need for a safety chain attachment device that is easy to install and that generally prevents voiding of manufacturer warranties.

SUMMARY OF THE PRESENT INVENTION

A safety chain engaging device for a towing vehicle having a gooseneck hitch attached with a rail of the towing vehicle is shown and described. The safety chain engaging device may include a first bracket configured to be secured with the rail of the towing vehicle, and a second bracket attached with the first bracket, the second bracket including a plate member spaced from the first bracket. The safety chain engaging device may also include at least one safety chain engaging member secured with the plate member, where the safety chain engaging member is configured to be laterally spaced from the rail upon securement of the first bracket with the rail.

A safety chain engaging device for a gooseneck hitch of a towing vehicle may include a first bracket having an aperture, the aperture configured to engage a hitch ball mount sleeve of the gooseneck hitch, where the bracket is configured to engage a portion of the gooseneck hitch below a load bed of the towing vehicle. The safety chain engaging device may also include a second bracket attached with the first bracket, where a plate portion of the second bracket is laterally spaced from the first bracket, and at least one safety chain engaging member engaged with the plate portion of the second bracket, where the at least one safety chain engaging member is spaced from and free of engagement with the gooseneck hitch.

A safety chain engaging device for a towing vehicle having a gooseneck hitch attached to a transverse frame member of the towing vehicle may include a first bracket configured to secure with the frame member of the towing vehicle. The safety chain engaging device may also include a second bracket attached with the first bracket, the second bracket including an engaging portion, where the second bracket is configured where the engaging portion is positioned outboard of the frame member upon attachment of the first bracket with the frame member, and at least one chain engaging member secured with the engaging portion.

A method of securing a safety chain engaging device to a towing vehicle having a transverse frame member positioned below a load bed of the towing vehicle may include the steps of providing a first bracket and a second bracket attached with the first bracket, the second bracket including an engaging portion, and securing the first bracket with the frame member of the towing vehicle, where the engaging portion is positioned outboard of the frame member. The method may further include aligning at least one chain engaging member with the engaging portion, and securing the at least one engaging member with the engaging portion.

BRIEF DESCRIPTION OF THE DRAWINGS

Operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
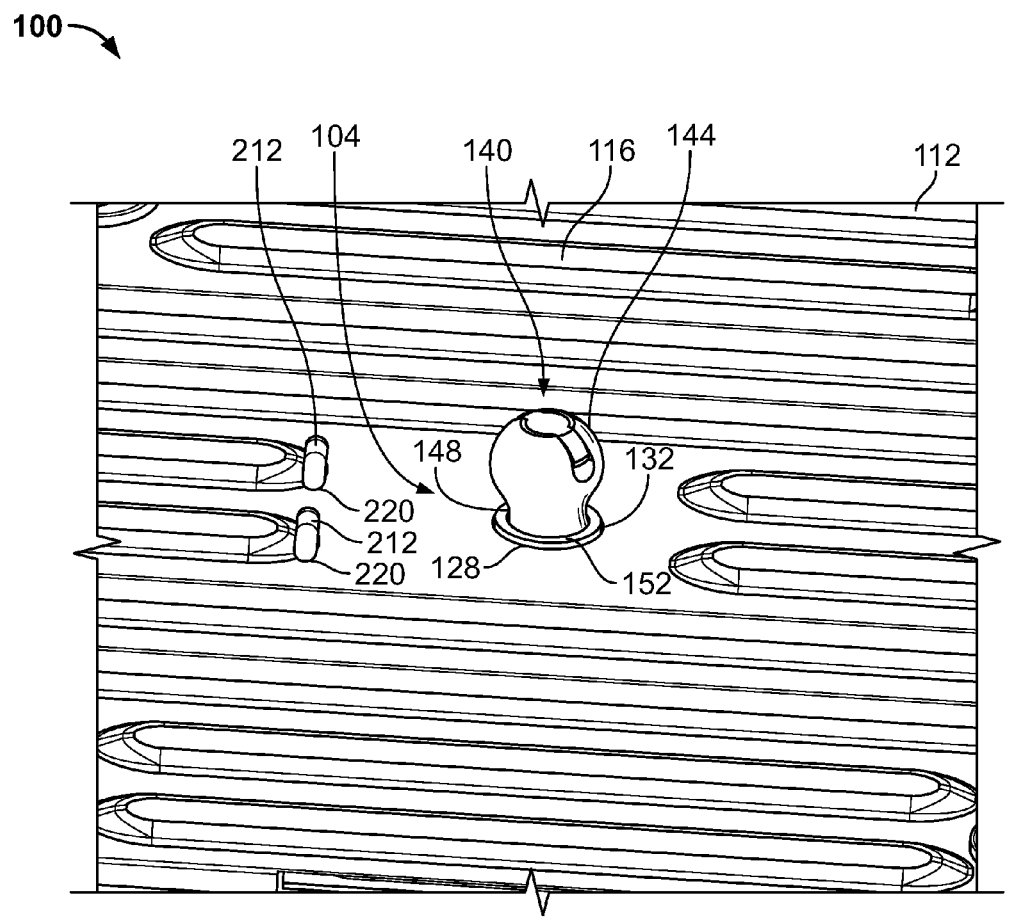
FIG. 1 is a perspective view of a portion of a load bed of a towing vehicle with a safety chain engaging device in a retracted position and gooseneck hitch with ball attached.
Figure 11:
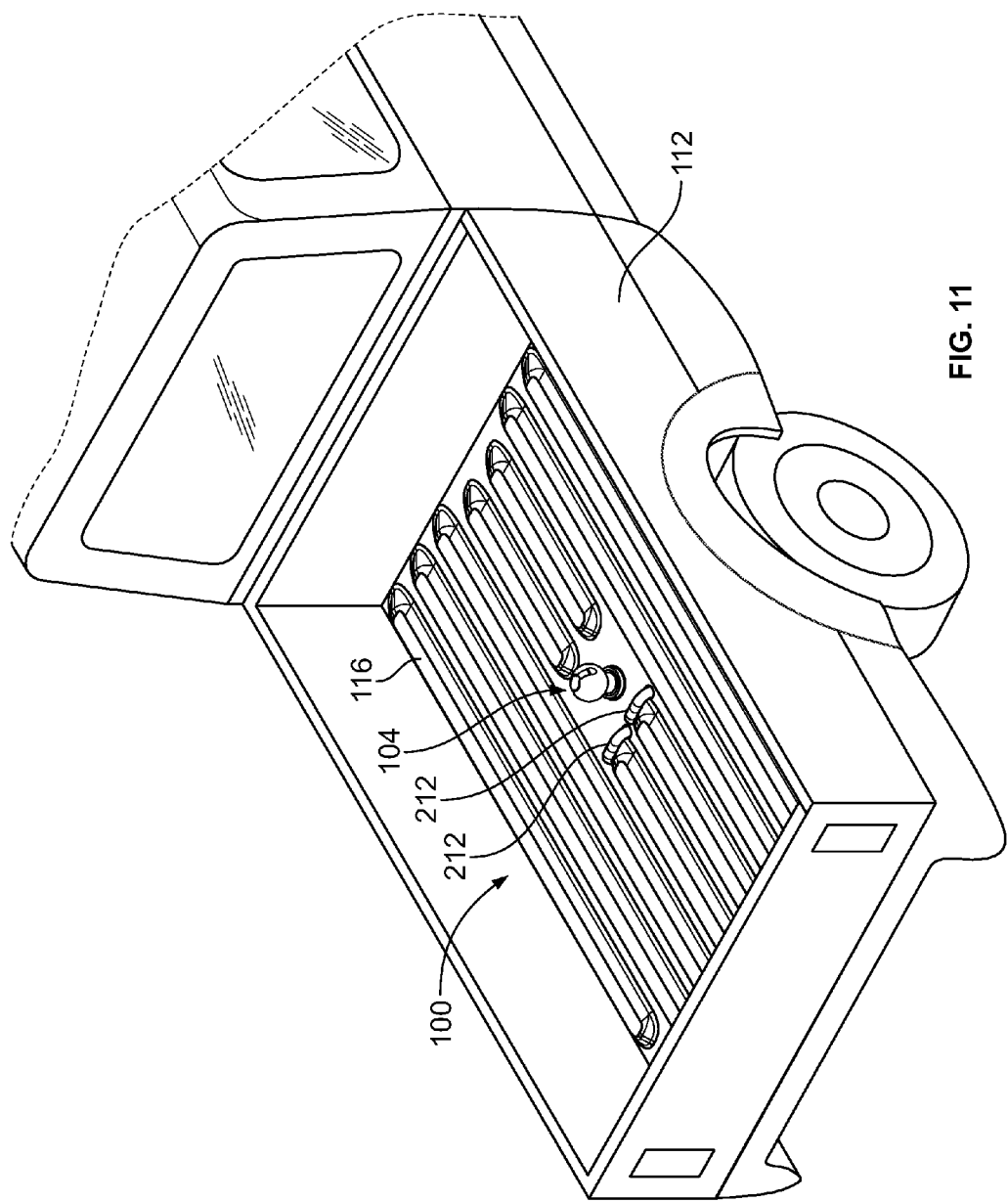
FIG. 11 is a perspective view of a safety chain engaging device and gooseneck hitch attached with a towing vehicle.

A safety chain engaging device 100 is shown in FIGS. 1 and 11 in a retracted position. The safety chain engaging device 100 may be constructed to securely anchor down a safety chain used with a trailer hitch—such as a gooseneck hitch 104 shown in FIGS. 1 and 11. The safety chain engaging device 100 may be of any appropriate shape or size in addition to those shown in the figures. The safety chain engaging device 100 may be used with any appropriate trailer hitch mounting system, and is not limited to the gooseneck hitch 104 shown.

The gooseneck hitch 104 may be attached with a frame member 108 of a towing vehicle 112. The frame member 108 may be positioned generally over the rear axle of the towing vehicle 112 and may be positioned below a load bed 116 of the towing vehicle 112. The frame member 108 may be part of the frame system of the towing vehicle 112. The frame member 108 may be positioned transversely to and attached between side frames of the towing vehicle 112. The frame member 108 may include a pair of laterally spaced recesses 120 that may be positioned immediately below the load bed 116.

The frame member 108 may further include an aperture 124 positioned generally on or in proximity to a center portion of the frame member 108. The aperture 124 may be monolithically formed with the frame member 108 or may be formed in a subsequent operation. In some embodiments, the aperture 124 may be formed or otherwise included in the frame member 108 contemporaneously with or before the assembly of the towing vehicle 112. A corresponding aperture 128 may be formed in the load bed 116 of the towing vehicle 112, whereby the aperture 128 is axially aligned with the aperture 124.

The gooseneck hitch 104 may include a gooseneck sleeve member 132 secured with or otherwise engaged with the frame member 108. The gooseneck sleeve member 132 may extend through aperture 128. Moreover, the sleeve member 132 may extend into the aperture 124 and may be operatively secured with the frame member 108 in any appropriate manner. By way of a non-limiting example, the sleeve member 132 may be welded to the frame member 108, or may be selectively secured with the frame member 108 such as through use of fasteners or the like.

The sleeve member 132 may include a socket 136 configured to operatively accept a hitch ball assembly 140 of any appropriate configuration. By way of non-limiting examples, the hitch ball assembly 140 may be of at least one of the configurations shown and described in U.S. Pat. Nos. 6,783,144, 6,983,950 and 8,011,685 and U.S. patent application Ser. Nos. 13/666,456 and 13/833,789, all of which are incorporated herein by reference. As shown, the hitch ball assembly 140 may include a ball member 144 and a body 148. The ball member 144 may be shaped to receive a corresponding socket (not shown) of a towed vehicle, such as a gooseneck coupler. It is to be understood that the ball member 144 may be of any appropriate or conventional shape and size in the towing field. The sleeve member 132 may operatively accept the body 148 of the hitch ball assembly 140 such that the hitch ball assembly 140 may be operatively connected with the coupler socket (not shown) of the towed vehicle (not shown).

The sleeve member 132 may include a generally planar top surface 152. The top surface 152 may, when the sleeve member 132 is attached with frame member 108, be generally planar with the load bed 116 of the towing vehicle 112. The top surface 152 may also be generally axially above or below the load bed 116 of the towing vehicle 112, but in close proximity thereto.

Figure 3:
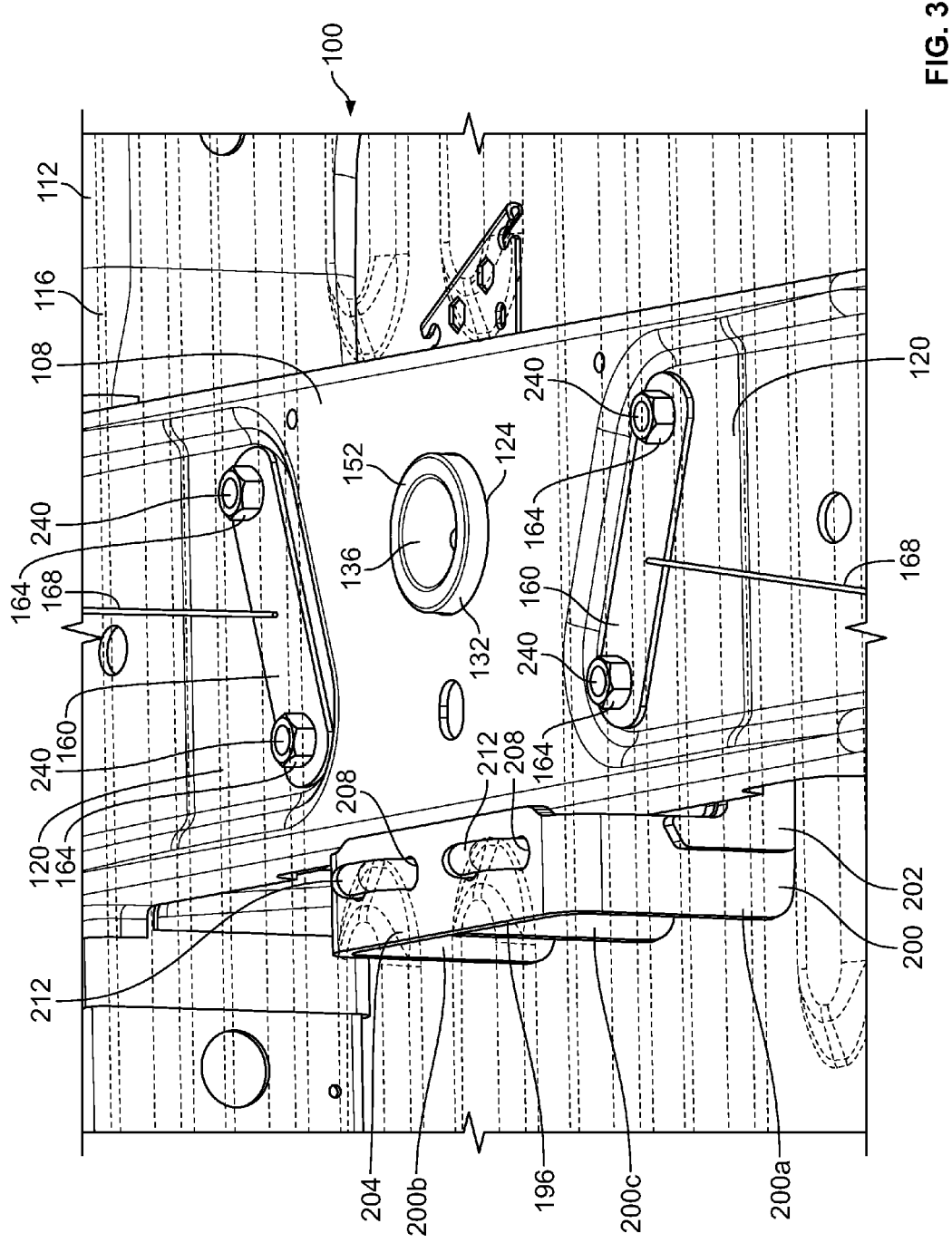
FIG. 3 is a top perspective view of a load bed of a towing vehicle in phantom with a safety chain engaging device and gooseneck hitch attached.

The safety chain engaging device 100 may include a bracket member 156 that may be attached with the frame member 108 in any appropriate manner. The present safety chain engaging device 100 may be efficiently attached to the towing vehicle 112. By way of a non-limiting example, the safety chain engaging device 100 may utilize at least one elongated plate member 160 to secure the bracket member 156 to the frame member 108. As shown in FIG. 3, a pair of elongated plate members 160 may be used. It should be understood, however, that any appropriate number of elongated plate members 160 may be used without departing from the present teachings. The elongated plate member 160 may include at least one fastening device 164 attached thereto. By way of a non-limiting example and as shown, the fastening device 164 may include a pair of nuts 164 welded to or otherwise attached with the elongated plate member 160 in any appropriate manner. The nuts 164 may be generally aligned with apertures (not shown) in the elongated plate member 160.

The elongated plate member 160 may also include a guide wire 168 attached thereto in any appropriate manner. By way of a non-limiting example, the guide wire 168 may be welded to the elongated plate member 160. It should be understood, however, that the guide wire 168 may also be adhered or attached via fastener to the elongated plate member 160. The guide wire 168 may be of a configuration to assist the operator in manipulating the position of the elongated plate member 160 during assembly of the safety chain engaging device 100 to the towing vehicle 112 as is described in more detail below.

The bracket member 156 may include a central portion 172 having a generally planar portion 176. The generally planar portion 176 may be positioned generally axially below the load bed 116 of the towing vehicle 112, or more specifically, it may be positioned below the frame member 108 when the safety chain engaging device 100 is attached to the towing vehicle. The central portion 172 and generally planar portion 176 may be of an appropriate shape and size such that they may fit below the frame member 108 and may avoid interference with the other parts of the towing vehicle 112.

An aperture 180 may be formed in the central portion 172. The aperture 180 may be of a shape and size such that the sleeve member 132 may be inserted through the aperture 180. Aperture 180 may be axially aligned with the apertures 124, 128 when the safety chain engaging device 100 is attached with the towing vehicle 112. The aperture 180 may generally circumscribe the sleeve member 132. Once the sleeve member 132 is inserted through the aperture 180, the safety chain engaging device 100 may be engaged or otherwise secured with the sleeve member 132. Aperture 180 may provide clearance for sleeve member 132 to extend below the bracket member 156. Although in some embodiments, the aperture 180 may merely circumscribe the sleeve member 132.

The bracket member 156 may include a channel member 184 attached with a bottom portion 188 of the central portion 172. The channel member 184 may be monolithically formed with the central portion 172 or may be attached such as through welding, using adhesive or fastening. The channel member 184 may provide additional stiffness and rigidity to the bracket member 156. The channel member 184 may be of any appropriate configuration and is not limited to that shown and described herein. The channel member 184 may extend axially downward from the central portion 172. As shown, the channel member 184 may have a generally C-shaped cross-sectional shape such that when attached with the bottom portion 188 of the central portion 172 a void is formed. The void may reduce weight of the safety chain engaging device 100 and may provide the appropriate spacing thereof below the frame member 108 of the towing vehicle 112.

The channel member 184 may include an aperture 192 generally axially aligned with apertures 124, 128 and 180 when the safety chain engaging device 100 is attached with the towing vehicle 112. The aperture 192 may generally circumscribe the sleeve member 132. Once the sleeve member 132 is inserted through the aperture 192, the safety chain engaging device 100 may in some embodiments be engaged or otherwise secured with the sleeve member 132. Aperture 192 may provide clearance for sleeve member 132 to extend below the bracket member 156. Although in some embodiments, the aperture 192 may merely circumscribe the sleeve member 132.

The safety chain engaging device 100 may include a cantilevered portion 196 extending from the bracket member 156 and may be spaced therefrom. The cantilevered portion 196 may be attached with the bracket member 156 in any appropriate manner. The cantilevered portion 196 may include at least one plate member 200 attached to the bracket member 156 in any appropriate manner. As shown in the drawings, the cantilevered portion 196 may include three such plate members 200; although any appropriate number of plate members 200 may be utilized. The plate members 200 may be attached with the bracket member 156 such as through welding, fastening, or adhering. In addition, the plate members 200 may be monolithically formed with the bracket member 156.

Figure 6:
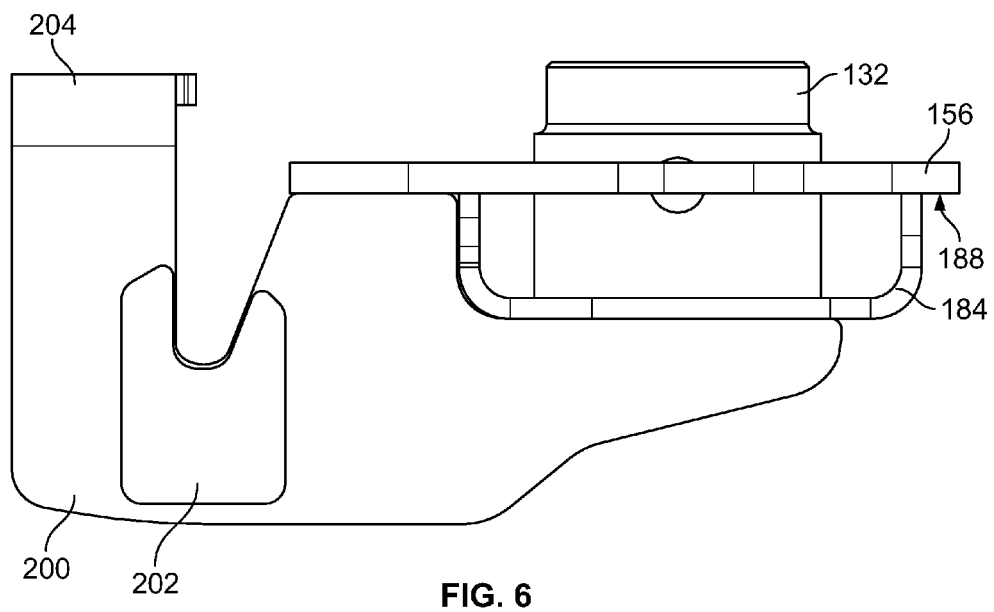
FIG. 6 is side view of a safety chain engaging device attached with a portion of a towing vehicle.
Figure 7:
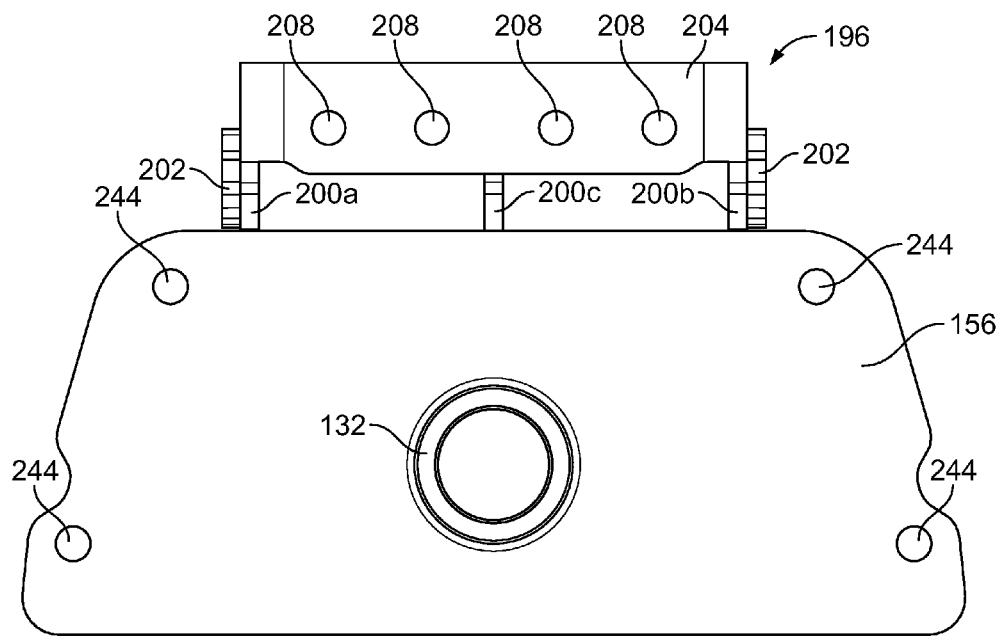
FIG. 7 is a top view of a safety chain engaging device attached with a portion of a towing vehicle.
Figure 8:
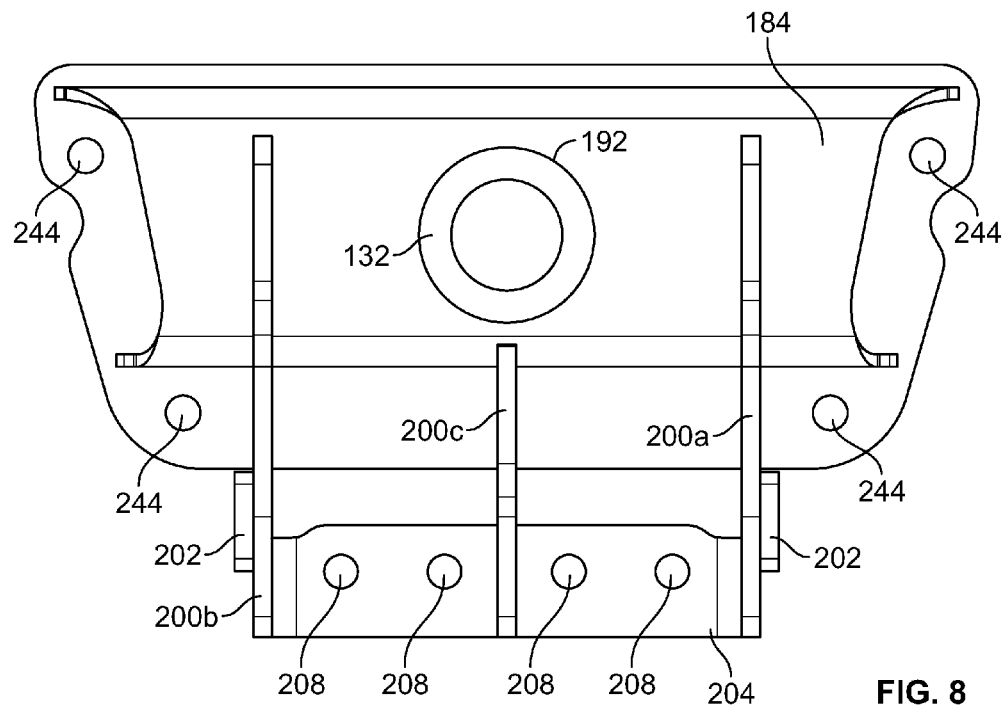
FIG. 8 is a bottom view of a safety chain engaging device attached with a portion of a towing vehicle.
Figure 9:
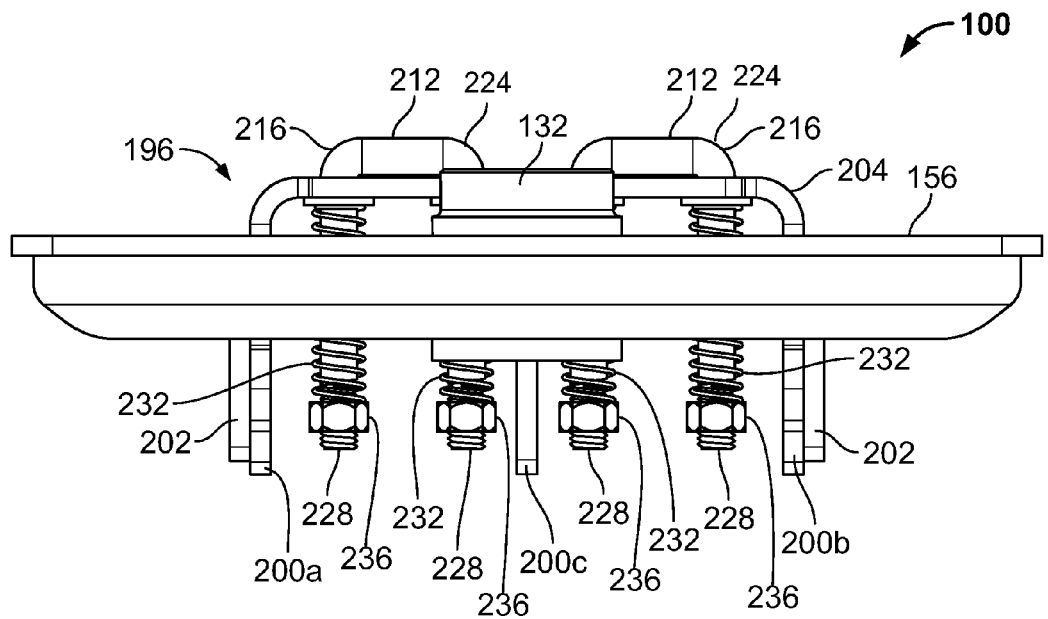
FIG. 9 is a first side view of a safety chain engaging device attached with a portion of a towing vehicle.
Figure 10:
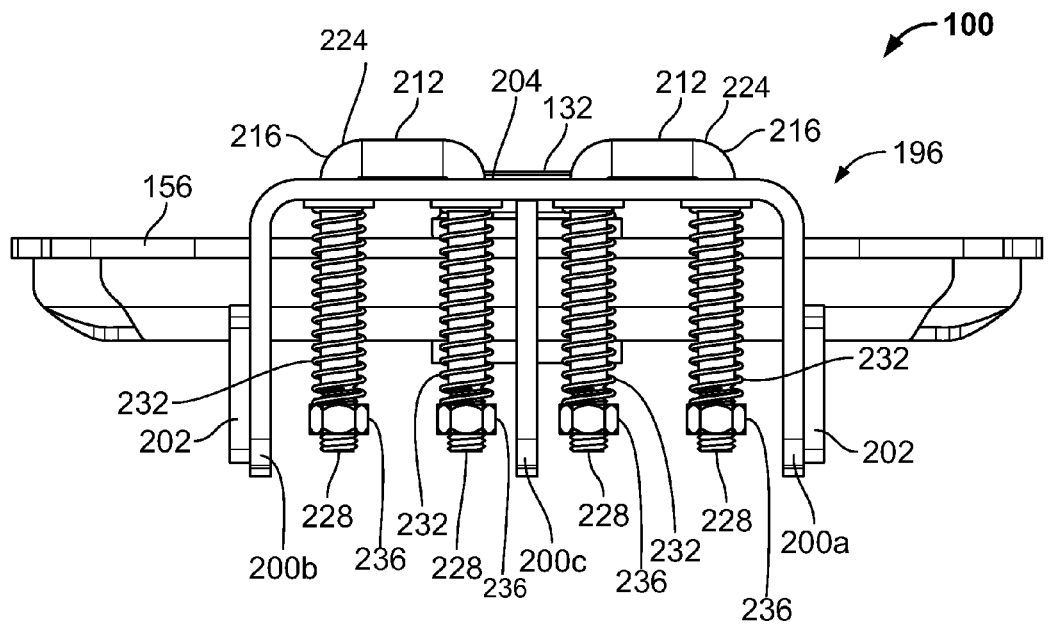
FIG. 10 is a second side view of a safety chain engaging device attached with a portion of a towing vehicle.

The plate members 200 may be positioned generally perpendicular with the bottom portion 188 of the bracket member 156. Further, as shown in FIGS. 3 and 6, a portion of the plate members 200 may be attached with the bottom portion 188 of the bracket member 156 and with the channel member 184. The present teachings, however, are not limited to this configuration. Any appropriate configuration may be used without departing from the present teachings.

At least one of the plate members 200 may further include a reinforcing gusset 202. The reinforcing gusset 202 may provide additional stiffness and rigidity to the plate member 200 to which it is attached. The reinforcing gusset 202 may be attached to the plate member 200 in any appropriate manner, including, without limitation via welding, fastening, or adhering. The reinforcing gusset 202 may also be monolithically formed with the plate member 200. Any number of reinforcing gussets 202 may be used. By way of non-limiting examples, each plate member 200 may include the reinforcing gusset 202, two of the plate members 200 may include the reinforcing gusset 202 or one of the plate members 200 may include the reinforcing gusset 202. Still further, the reinforcing gusset 202 may not be utilized depending upon thickness of the plate members 200, material used to form the plate member 200 or a combination of such.

Figure 4:
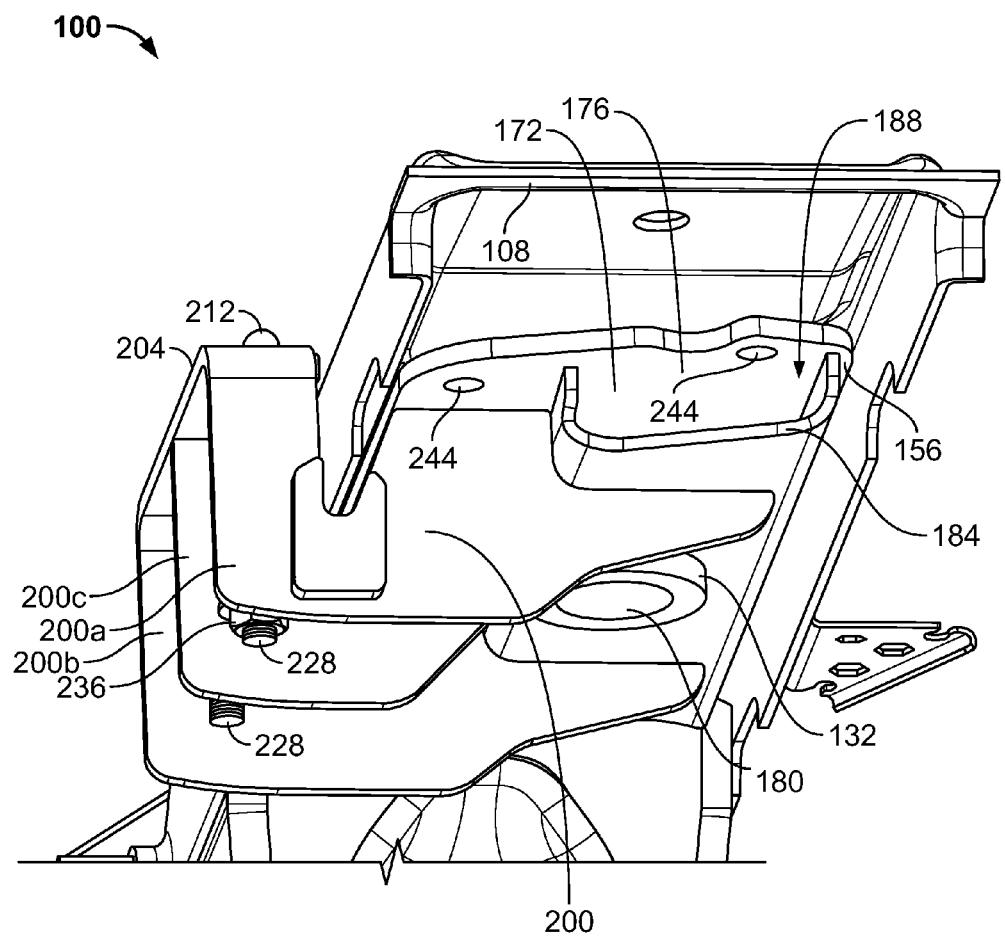
FIG. 4 is bottom perspective view of a safety chain engaging device and bracket attached with a frame of a towing vehicle.
Figure 5:
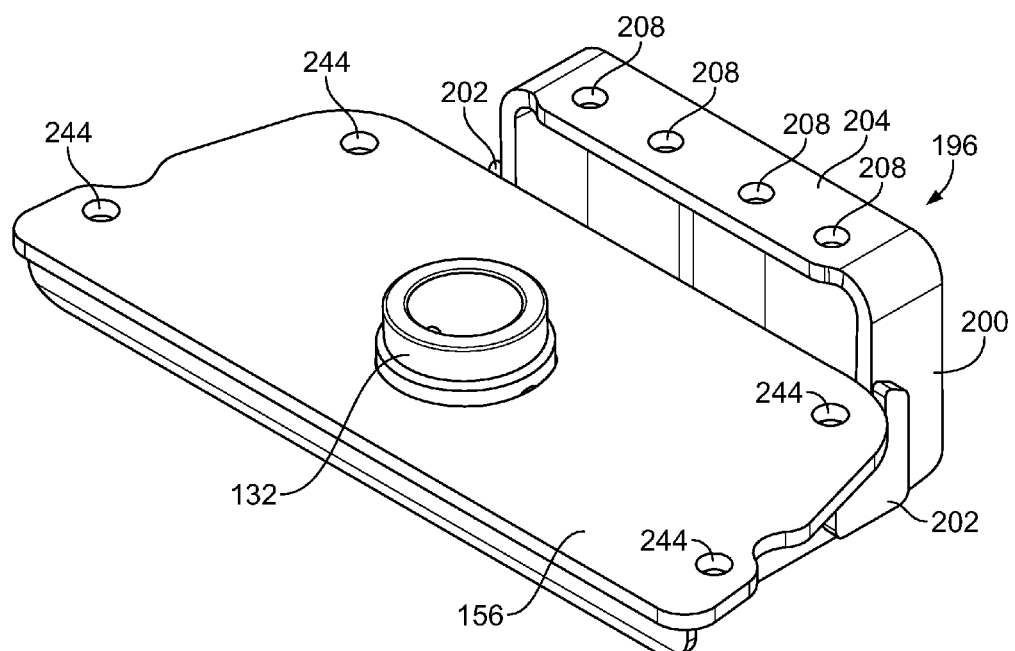
FIG. 5 is a perspective view of a safety chain engaging device attached with a portion of a towing vehicle.

The cantilevered portion 196 may include a plate 204 that may be attached with at least one of the plate members 200. As shown in FIG. 4, the plate 204 may be positioned generally perpendicularly with the plate members 200 and may be attached with any number of the plate members 200. In embodiments that utilize three plate members 200 (as shown in FIG. 4), the plate members 200 may be aligned with two end plate members 200a, 200b and a middle plate member 200c. In such embodiments, the plate 204 may be monolithically formed with the end plate members 200a, 200b while the middle plate member 200c may be attached in a subsequent operation, such as welding, fastening or adhering. In other embodiments, all of the plate members 200 may be monolithically formed with the plate 204. In yet other embodiments, one of the plate members 200 may be monolithically formed with the plate 204 and the other two plate members 200 may be attached such as through welding, fastening or adhering. In yet other embodiments, all of the plate members 200 may be attached to the plate 204 such as through welding, fastening or adhering.

The plate 204, when secured with the plate members 200, may be generally laterally spaced from the bracket member 156. The plate 204 may likewise be laterally spaced from the frame member 108 when the safety chain engaging device 100 is secured with the towing vehicle 112. By way of non-limiting example, the plate 204 may be positioned fore or aft of the frame member 108, i.e., the plate 204 may extend either toward a cab of the towing vehicle 112 or away from the cab of the towing vehicle 112. The plate 204 may, when the cantilevered portion 196 is attached with the bracket member 156, be generally parallel with the length of the frame member 108. Additionally, when the safety chain engaging device 100 is attached with the towing vehicle 112, the plate 204 may generally extend above the bracket assembly 156. In some embodiments, the plate 204 may be in close proximity to or in contact with an underside of the load bed 116 of the towing vehicle 112.

The plate 204 may include a plurality of apertures 208. The apertures 208 may be monolithically formed with the plate 204, may be formed through a subsequent operation or may be formed during installation of the safety chain engaging device 100 as described in more detail below. In some embodiments, the plate 204 may include two sets of pairs of apertures 208. The first set of pair of apertures 208 may be located on one side of the middle plate member 200c and a second set of pair of apertures 208 may be located on another side of the middle plate member 200c. While two sets of apertures are shown and described, the present teachings are not limited to such. Any appropriate number of apertures 208 may be used.

The safety chain engaging device 100 may include at least one safety chain engaging member 212 that may be spaced from the frame member 108; i.e., the safety chain engaging member are not engaged with or otherwise in contact with the frame member 108. The safety chain engaging member 212 may include at least one generally U-shaped member 216, which may be inserted into and through apertures 220 in the load bed 116 and the apertures 208 of the plate 204. By way of a non-limiting example, the U-shaped member 216 may include a U-shaped bolt 224 having threaded ends 228.

Figure 2:
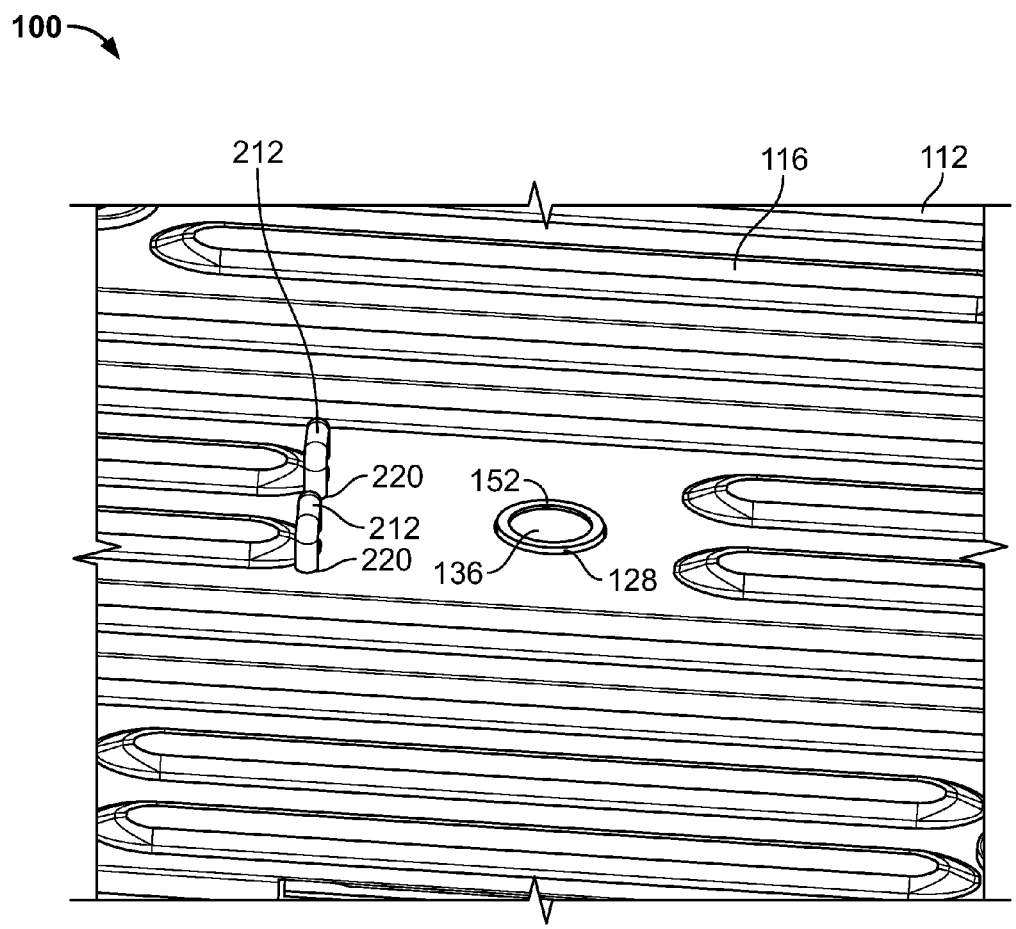
FIG. 2 is a perspective view of a portion of a load bed of a towing vehicle with a safety chain engaging device in an extended position and gooseneck hitch attached.

A biasing member 232, such as by way of a non-limiting example a compression spring, may be provided around each threaded end 228 of the U-shaped bolt 224. The biasing member 232 may be held in place by a fastening device 236, such as a nut threaded onto the threaded end 228 of the U-shaped bolt 224. The biasing member 232 may provide a biasing force to urge the U-shaped member 216 in a downward direction relative to the load bed 116 to position the safety chain engaging device 100 in a retracted position, as shown in FIGS. 1 and 11. An operator may pull upward on the U-shaped member 216 with a force greater than the biasing force of the biasing member 232. This may position the safety chain engaging device 100 in an extended position, as shown in FIG. 2.

While in the extended position, the operator may engage a safety chain (not shown) between the safety chain engaging device 100 and the load bed 116 of the towing vehicle 112. Once the safety chain is properly fed through the U-shaped member 216, the operator may then simply release the U-shaped member 216 and the biasing force of the biasing member 232 may cause the U-shaped member 216 to move downward to securely hold the safety chain in place.

Configuration of the safety chain engaging device 100 may make installation onto the towing vehicle 112 efficient. To install the safety chain engaging device 100 the operator may access the towing vehicle 112 under the load bed 116. The operator may grasp the guide wire 168 of the elongated plate member 160. Using the guide wire 168, the operator may position the elongated plate member 160 within the recess 120 of the frame member 108. The elongated plate member 160 may be of a shape and size to generally fit within at least a portion of the recess 120. The operator may, using the guide wire 168, position the elongated plate member 160 such that the apertures of the elongated plate member 160, and the nuts 164 may generally align with apertures (not shown) in the frame member 108.

Once the elongated plate members 160 are appropriately aligned with respect to the frame member 108, the operator may position the bracket member 156 in an appropriate position, such as immediately below and adjacent the frame member 108. The bracket member 156 may include apertures 244 that may be aligned with apertures in the frame member 108 and the elongated plate member 160. As the apertures in the elongated plate 160 may be generally aligned with the nuts 164, the nuts 164 may be generally aligned with the aperture 244 of the bracket member 156.

Once aligned, fasteners 240 may be used to secure safety chain engaging device 100 with the frame member 108. Fasteners 240 of any appropriate configuration may be inserted into the apertures 244 of the bracket member 156 and through apertures in the frame member 108 and into the nuts 164. In some embodiments, the fasteners 240 may include threads that may be configured to engage with the nuts 164. In such embodiments, the fasteners 240 may be threadably engaged with the nuts 164 and secured with the frame member 108. Although the present teachings depict fasteners with threads, the present teachings are not limited to such. Any appropriate fastening device may be used.

In those embodiments in which the cantilevered portion 196 is already attached with the bracket member 156, once the bracket member 156 is attached with the frame member 108, the cantilevered portion 196 may be positioned appropriately with respect to the frame member 108. Specifically, the cantilevered portion 196 or more specifically the plate 204 and ultimately the safety chain engaging members 212 may be laterally spaced from the frame member 108 as described below. This may result in the safety chain engaging members 212 being positioned fore or aft of the frame member 108.

In those embodiments in which the cantilevered portion 196 is not already attached with the bracket member 156, the cantilevered portion 196 may be attached with the bracket member 156 as described above. In attaching the cantilevered portion 196 of this embodiment, the plate 204 and safety chain engaging members 212 may be laterally spaced from the frame member 108. The safety chain engaging members 212 may be positioned fore or aft of the frame member 108.

Once the cantilevered portion 196 is attached with the frame member 108, such as through bracket member 156, the operator may install the safety chain engaging member 212. In some embodiments, the operator may utilize the safety chain engaging member 212, or more specifically, the threaded ends 228 of the U-shaped bolt 224 to define the appropriate position for the safety chain engaging member 212 with respect to the load bed 116. The operator may position the threaded ends 228 of the U-shaped bolt 224 in the load bed 116 immediately above the plate 204. The operator may mark the location of the threaded ends 228 and drill apertures into the load bed 116. The operator may also drill apertures into and through the plate 204 if apertures are not otherwise formed therein. Once the apertures are drilled, the operator may insert the threaded ends 228 into and through the apertures. The operator may then access the underside of the load bed 116 and install the biasing member 232 and nuts 236 onto the threaded ends 228. The safety chain engaging device 100 may then be available for use.

While the terms bracket and plate have been used herein, these terms are not intended to be limiting. These terms may be used interchangeably whereby a bracket may be referred to as a plate member and a plate may be referred to as a bracket member. The configuration of the bracket and plate may be substantially the same or may be different from that shown or described; the present teachings are not limited to such.

Additional embodiments of a safety chain engaging device according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired safety chain engaging device without departing from the spirit and scope of the present invention.

In some embodiments, the safety chain engaging device 100 may be attached with the frame member 108 through welding it instead of using the fastening device 164 and elongated plate members 160. In such embodiments, the operator may weld the bracket member 156 directly to an underside portion of the frame member 108.

Although the preferred embodiment of the present invention has been illustrated in the accompanying drawings and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

Having thus described the invention, we claim:

1. A safety chain engaging device for a towing vehicle having a gooseneck hitch attached with a transversely extending frame member of the towing vehicle, the safety chain engaging device comprising:
   a first bracket configured to be secured with the frame member of the towing vehicle and having at least a portion thereof configured to be disposed axially beneath the frame member upon securement of the first bracket with the frame member;
   a second bracket attached with the first bracket, the second bracket including a plate member spaced from the first bracket such that at least a portion of the frame member is configured to be positioned between the plate member and the first bracket; and
   at least one safety chain engaging member secured with the plate member, wherein the at least one safety chain engaging member is spaced from the frame member upon securement of the first bracket with the frame member.

2. The safety chain engaging device of claim 1, wherein the at least one safety chain engaging member includes a generally U-shaped member having legs, whereby at least one of the legs of the U-shaped member is secured with the plate member.

3. The safety chain engaging device of claim 2, wherein the legs of the U-shaped member are secured with the plate member.

4. The safety chain engaging device of claim 2, wherein the U-shaped member is a U-bolt.

5. The safety chain engaging device of claim 1, wherein the at least one safety chain engaging member includes a pair of safety chain engaging members spaced from the frame member upon securement of the first bracket with the frame member.

6. The safety chain engaging device of claim 1, wherein the at least one safety chain engaging member is positioned fore of the frame member.

7. The safety chain engaging device of claim 1, wherein the at least one safety chain engaging member is positioned aft of the frame member.

8. The safety chain engaging device of claim 1, wherein the first bracket includes an aperture configured to circumscribe a ball sleeve of the gooseneck hitch.

9. The safety chain engaging device of claim 1, wherein the second bracket includes at least one reinforcing gusset.

10. The safety chain engaging device of claim 1, wherein the at least one safety chain engaging member is free of contact with the frame member of the towing vehicle.

11. The safety chain engaging device of claim 1, wherein the frame member of the towing vehicle extends transversely to and is attached between side frames of the towing vehicle.

12. The safety chain engaging device of claim 1, wherein the second bracket is welded to the first bracket.

13. A safety chain engaging device for a gooseneck hitch of a towing vehicle attached with a transversely extending frame member of the towing vehicle, the safety chain engaging device comprising:
   a first bracket having an aperture and a top surface, the aperture configured to engage a hitch ball mount sleeve of the gooseneck hitch, wherein the first bracket is configured to engage the frame member whereby the top surface of the first bracket is entirely covered by the frame member;
   a second bracket attached with the first bracket, wherein a plate portion of the second bracket is spaced from the first bracket; and
   at least one safety chain engaging member engaged with the plate portion of the second bracket, wherein the at least one safety chain engaging member is spaced from and free of engagement with the gooseneck hitch.

14. The safety chain engaging device of claim 13, wherein the at least one safety chain engaging member includes a generally U-shaped member having legs whereby at least one of the legs of the U-shaped member is engaged with the plate portion.

15. The safety chain engaging device of claim 14, wherein the legs of the U-shaped member are engaged with the plate portion.

16. The safety chain engaging device of claim 14, wherein the U-shaped member is a U-bolt.

17. The safety chain engaging device of claim 13, wherein the at least one safety chain engaging member is laterally spaced fore or aft from the frame member of the towing vehicle.

18. The safety chain engaging device of claim 13, wherein the at least one safety chain engaging member is positionable between retracted and extended positions.

19. The safety chain engaging device of claim 13, wherein the second bracket is welded to the first bracket.

20. A safety chain engaging device for a towing vehicle having a gooseneck hitch attached to a single transverse frame member of the towing vehicle, the safety chain engaging device comprising:
   a first bracket configured to secure with the single frame member of the towing vehicle;
   a second bracket attached with the first bracket, the second bracket including an engaging portion, wherein the engaging portion is positioned outboard of the single frame member upon attachment of the first bracket with the single frame member;
   an attachment member configured to secure the first bracket axially beneath the single frame member wherein the attachment member includes an elongated plate having at least one fastening device, whereby the elongated plate is configured to be positioned between the single frame member and a load bed of the towing vehicle; and
   at least one chain engaging member secured with the engaging portion.

21. The safety chain engaging device of claim 20, wherein the at least one chain engaging member includes a generally U-shaped member having legs whereby at least one of the legs of the U-shaped member is engaged with the engaging portion.

22. The safety chain engaging device of claim 21, wherein the legs of the U-shaped member are engaged with the engaging portion.

23. The safety chain engaging device of claim 21, wherein the U-shaped member is a U-bolt.

24. The safety chain engaging device of claim 20, wherein the at least one chain engaging member is positioned outboard of the single frame member upon attachment of the first bracket with the single frame member.

25. The safety chain engaging device of claim 20, wherein the at least one chain engaging member is free of engagement with the single frame member.

26. The safety chain engaging device of claim 20, further comprising a guide device attached with the attachment member, whereby the guide device is configured to position the attachment member.

27. The safety chain engaging device of claim 20, wherein the at least one chain engaging member is positioned either fore or aft relative to the single frame member.

28. The safety chain engaging device of claim 20, wherein the second bracket is welded to the first bracket.

29. A safety chain engaging device for a towing vehicle having a gooseneck hitch attached to a transverse frame member of the towing vehicle, the safety chain engaging device comprising:
- a first bracket configured to secure with the frame member of the towing vehicle;
- a second bracket attached with the first bracket, the second bracket including an engaging portion, wherein the engaging portion is positioned outboard of the frame member upon attachment of the first bracket with the frame member;
- at least one chain engaging member secured with the engaging portion; and
- an attachment member configured to secure the first bracket axially beneath the frame member, wherein the attachment member includes an elongated plate having at least one fastening device, whereby the elongated plate is configured to be positioned between the frame member and a load bed of the towing vehicle.

30. The safety chain engaging device of claim 29, wherein the at least one chain engaging member includes a generally U-shaped member whereby at least one leg of the U-shaped member is secured with the engaging portion.

31. The safety chain engaging device of claim 30, wherein the U-shaped member is a U-bolt.

32. The safety chain engaging device of claim 29, wherein the second bracket is welded to the first bracket.

33. The safety chain engaging device of claim 29, wherein the at least one chain engaging member is positioned outboard of the frame member upon attachment of the first bracket with the frame member.

34. The safety chain engaging device of claim 29, wherein the at least one chain engaging member is free of engagement with the frame member.

35. The safety chain engaging device of claim 29, wherein the at least one chain engaging member is positioned either fore or aft relative to the frame member.

* * * * *